(12) United States Patent
Namiki et al.

(10) Patent No.: US 9,679,670 B2
(45) Date of Patent: Jun. 13, 2017

(54) AGGREGATE OF RADIOACTIVE MATERIAL REMOVING PARTICLES AND METHOD OF PRODUCING THE SAME, AND METHOD OF REMOVING CONTAMINANT

(71) Applicants: THE JIKEI UNIVERSITY, Tokyo (JP); DOWA HOLDINGS CO., LTD., Tokyo (JP)

(72) Inventors: Yoshihisa Namiki, Tokyo (JP); Toshihiko Ueyama, Tokyo (JP); Takayuki Yoshida, Tokyo (JP)

(73) Assignees: THE JIKEI UNIVERSITY, Tokyo (JP); DOWA HOLDINGS CO., LTD., Tokyo (JP)

( * ) Notice: Subject to any disclaimer, the term of this patent is extended or adjusted under 35 U.S.C. 154(b) by 259 days.

(21) Appl. No.: 14/280,979

(22) Filed: May 19, 2014

(65) Prior Publication Data
US 2014/0346115 A1    Nov. 27, 2014

(30) Foreign Application Priority Data

May 17, 2013  (JP) ................................. 2013-105471

(51) Int. Cl.
| | |
|---|---|
| *G21F 9/12* | (2006.01) |
| *C02F 1/28* | (2006.01) |
| *C02F 1/48* | (2006.01) |
| *B01J 20/26* | (2006.01) |
| *B01J 20/28* | (2006.01) |
| *B01J 20/32* | (2006.01) |
| *C02F 101/00* | (2006.01) |
| *C02F 103/18* | (2006.01) |

(52) U.S. Cl.
CPC .............. *G21F 9/12* (2013.01); *B01J 20/265* (2013.01); *B01J 20/28073* (2013.01); *B01J 20/28076* (2013.01); *B01J 20/3289* (2013.01); *C02F 1/281* (2013.01); *C02F 1/288* (2013.01); *C02F 1/488* (2013.01); *C02F 2101/006* (2013.01); *C02F 2103/18* (2013.01); *Y10T 428/2982* (2015.01)

(58) Field of Classification Search
CPC .. G21F 9/12; C02F 1/288; C02F 1/488; C02F 1/281; C02F 2101/006; C02F 2103/18; B01J 20/265; B01J 20/28073; B01J 20/28076; B01J 20/3289; Y10T 428/2982
USPC ........................ 428/402; 210/682; 252/62.54
See application file for complete search history.

(56) References Cited

U.S. PATENT DOCUMENTS

2014/0042068 A1*  2/2014  Namiki ..................... G21F 9/12
                                                                  210/222

FOREIGN PATENT DOCUMENTS

JP          B1-4932054       *  5/2012

* cited by examiner

*Primary Examiner* — Leszek Kiliman
(74) *Attorney, Agent, or Firm* — Oliff PLC

(57) ABSTRACT

There is provided an aggregate of radioactive material removing particles in which two or more radioactive material removing particles having magnetic particles and a radioactive material adsorption component are assembled, wherein a pore volume in the aggregate is 0.5 mL/g or more and 5.0 mL/g or less, and the pore volume means a cumulative value obtained by a mercury press-in method.

20 Claims, 5 Drawing Sheets

AGGREGATE OF RADIOACTIVE MATERIAL REMOVING PARTICLES AND METHOD OF PRODUCING THE SAME, AND METHOD OF REMOVING CONTAMINANT

BACKGROUND

Technical Field

The present invention relates to an aggregate of radioactive material removing particles and a method of producing the same, and a decontamination method of removing a contaminant using the aggregate of radioactive material removing particles.

Description of Related Art

When a radioactive material is contained in incinerated fly ash generated in a general waste incineration site, etc., the radioactive material is an environmental regulation material, and a processing thereof is a problem.

$^{134}$Cs and $^{137}$Cs and particularly $^{137}$Cs in radioactive materials, has a long half-life of 30.2 years, thereby involving a problem that a major portion remains even after 10 years after generation. Therefore, the contaminant involves a risk of adversely affecting an environment and ecosystem on a long-time basis. Therefore, the contaminant is requested to be removed from the environment.

However, there is remarkably much accumulation of radioactive cesium in the incinerated fine fly ash with a particle size of 20 to 30 μm generated in the general waste incineration site, etc., and according to publicly-known documents, etc., the accumulation of cesium sometimes reaches several tens of thousands Bq/kg.

In view of such a circumstance, one of the inventors of the present invention discloses patent document 1 wherein a decontamination agent for removing radioactive cesium. The decontamination agent of patent document 1 is capable of removing the radioactive cesium efficiently from a liquid containing a radioactive material. Further, patent document 1 discloses a technique of separating and retrieving the radioactive cesium without directly touching on the decontamination agent that captures the radioactive cesium.

PRIOR ART PATENT DOCUMENT

Patent document 1: Patent Publication No. 4932054

As a result of investigating the decontamination agent, inventors of the present invention obtain a knowledge that response to magnet is remarkably improved if water-content is removed from the decontamination agent using a method such as drying, and two or more particles contained in the decontamination agent are assembled to be formed into an aggregate.

The inventors of the present invention also obtain a knowledge that a suspended substance and the aggregate of the decontamination agent can be easily separated by forming the aggregate of the decontamination agent even if the liquid to be processed is in a slurry state due to the suspended substance, and therefore if the radioactive cesium is separated from the suspended substance in the slurry and is absorbed by the decontamination reagent, remarkable reduction of a waste containing the radioactive cesium can be realized.

However, the inventors of the present invention also obtain a knowledge that remarkable volumetric shrinkage occurs at the time of drying, if the water-content is removed from the decontamination agent in a cake state, by drying so as to be formed into the aggregate, wherein the decontamination agent is in a dehydrated cake state having high water-content.

It is also found that due to the remarkable volumetric shrinkage, primary particles of the decontaminant agent adhere to each other, resulting in the formation of a firm aggregate with high density, and there is sometimes a case that a liquid to be treated containing water-soluble cesium is prevented from permeating into the aggregate. When the liquid to be treated containing water-soluble cesium is prevented from permeating into the aggregate, there is a problem of reducing a decontamination effect.

Under the abovementioned circumstance, the present invention is provided, and an object of the present invention is to provide the aggregate of the radioactive material and a method of producing the same, and a method of removing the radioactive material using the aggregate of radioactive material removing particles.

SUMMARY OF THE INVENTION

In order to solve the abovementioned subject, inventors of the present invention study on a form of an aggregate of a radioactive material removing particles, and as a result of strenuous efforts, it is found that remarkable shrinkage occurs at the time of drying when a decontamination agent in a cake state is heated or naturally dried, and due to such a shrinkage, liquid to be treated is hardly permeated into the aggregate of radioactive material removing particles.

Based on such a knowledge, it is also found that excellent decontamination ability is exhibited even in a short time from start of a process of removing the radioactive material, with a structure as follows: pores are formed in the aggregate of the radioactive material removing particle when the aggregate of radioactive material removing particles is formed, so that a liquid to be treated is easily permeated into the aggregate. The present invention is thus completed.

Namely, in order to solve the abovementioned subject, a first invention provides an aggregate of radioactive material removing particles in which two or more radioactive material removing particles having magnetic particles and a radioactive material adsorption component are assembled, wherein a pore volume in the aggregate is 0.5 mL/g or more and 5.0 mL/g or less, and the pore volume means a cumulative value obtained by a mercury press-in method.

A second invention provides an aggregate of radioactive material removing particles in which two or more radioactive material removing particles having magnetic particles and a radioactive material adsorption component are assembled, wherein a cumulative value of a pore volume in the aggregate is 0.3 mL/g or more and 3.0 mL/g or less in a range in which pore volume diameter in the aggregate is larger than an average particle size of each magnetic particle which is a source of the radioactive material removing particles, and smaller than an average particle size of the aggregate, wherein the pore volume means a cumulative value obtained by a mercury press-in method.

A third invention provides the aggregate of radioactive material removing particles of the first or second invention, wherein a specific surface area of the aggregate obtained by BET method is 1 m$^2$/g or more and 400 m$^2$/g or less, wherein the BET method is the method of not performing deaeration operation.

A fourth invention provides the aggregate of radioactive material removing particles according to any one of the first to third inventions, wherein the average particle size ($D_{50}$ diameter) is 0.1 μm or more and 100 μm or less.

A fifth invention provides the aggregate of radioactive material removing particles according to any one of the first to fourth inventions, wherein the radioactive material adsorption component is a ferrocyanide compound including at least one kind of transitional metal elements or group 12 elements.

A sixth invention provides a method of producing an aggregate of radioactive material removing particles, including the step of drying a slurry of a decontamination agent by spray drying, wherein ferrocyanide compound metal salt is formed as a radioactive material removing substance on a surface of a magnetic particle with polymer or monomer layer formed on its surface by wet process.

A seventh invention provides the method of producing an aggregate of radioactive material removing particles according to the sixth invention, including the steps of:

forming the polymer or monomer layer on the magnetic particle by adding polymer or monomer having cationic property, to the slurry in which the magnetic particles are dispersed; and forming a decontamination component on a coating layer and/or in the coating layer of the coating layer-attached magnetic particles by adding the ferrocyanide compound including at least one kind of the transition metal elements or the group 12 elements, to the slurry of the coating layer-attached magnetic particles.

An eight invention provides the method of producing an aggregate of radioactive material removing particles according to the sixth or seventh invention, wherein the spray drying is performed by a spray dryer.

A ninth invention provides a method of removing a contaminant, wherein the aggregate of radioactive material removing particles according to any one of the first to fifth inventions, is dispersed in a liquid to be treated containing a contaminant, so that the contaminant is moved to the aggregate of radioactive material removing particles.

A tenth invention provides the method of removing a contaminant according to the ninth invention, wherein the decontamination material is radioactive cesium and/or radioactive thallium.

The aggregate of radioactive material removing particles of the present invention, is capable of accelerating a permeation of the treatment liquid in a liquid to be treated containing a contaminant, and is capable of increasing a specific surface area of a radioactive material adsorption part per one aggregate by bonding a radioactive material adsorption component to a surface layer of the radioactive material removing particles constituting the aggregate. Therefore, the contaminant in the liquid to be treated can be removed efficiently in a short time.

DETAILED DESCRIPTION OF THE INVENTION

An aggregate of reactive material removing particles and a method of producing the same according to the present invention will be described hereafter in detail, in an order of (1) An aggregate of radioactive material removing particles, (2) A method of producing the aggregate of radioactive material removing particles, and (3) A method of removing a contaminant from a liquid to be treated using a radioactive material decontamination agent.

(1) An Aggregate of Radioactive Material Removing Particles

The aggregate of radioactive material removing particles according to the present invention is the aggregate formed by two or more radioactive material removing particles having magnetic particles and a radioactive material adsorption (absorption) component, wherein pores are formed in the aggregate.

More specifically, the aggregate has a structure in which a coating layer made of the radioactive material adsorption (absorption) component exists at least in a part of the surface of at least a part of the magnetic particles.

Explanation is given hereafter, in an order of <1> Magnetic particles, <2> A radioactive material adsorption (absorption) component, <3> Radioactive material removing particles, and <4> An aggregate of radioactive material removing particles.

<1> Magnetic Particles>

Magnetic particles as a core of the radioactive material removing particles according to the present invention, are the magnetic particles made of metal iron and/or iron alloy. The iron alloy is obtained by adding one kind or more of cobalt and nickel, etc., which are transitional metal elements other than iron, to iron for adjustment, and/or by adding one kind or more elements selected from silicon and aluminum for imparting oxidation stability.

The magnetic particles are the magnetic particles having an average primary particle size: 10 to 500 nm, preferably 10 to 400 nm, and further preferably 30 to 300 nm.

If the average primary particle size is 10 nm or more, the magnetic particles have sufficient magnetism, and preferably decontamination ability can be secured when magnetic separation is carried out. Meanwhile, if the average primary particle size is 500 nm or less, the radioactive material removing particles that can be dispersed in a liquid to be treated, can be obtained when a decontaminating operation is performed, owing to the structure in which pores are formed in each radioactive material removing particle described later.

The average primary particle size may be calculated as an average value of diameters of 100 or more particles, obtained by confirming each particle shown by a suitable magnifying powers, using a transmission electron microscope for example.

The shape of the magnetic particle is not particularly limited, and when the magnetic particle is a needle-like particle, or a particle similar to the needle-like particle, it seems that a large porosity is formed when forming the aggregate by drying the magnetic particles, and this is preferable from a viewpoint of the present invention.

When each magnetic particle has a needle-like shape, the abovementioned average primary particle size indicates an "average long axis length".

<2> A Radioactive Material Adsorption (Absorption) Component

The radioactive material adsorption (absorption) component exists at least in a part of the surface of the magnetic particles as described above. Then, the radioactive material adsorption (absorption) component is monomer and/or polymer having cationic property from a viewpoint of adhesion stability to the magnetic particle, and the monomer and/or the polymer having the cationic property includes a cesium adsorption component composed of ferrocyanide compound including at least one kind of transition metal elements or group 12 elements (described as "ferrocyanide compound metal salt" in the present invention in some cases).

(1) Polymer and monomer having cationic property, and
(2) Ferrocyanide compound metal salt, will be described hereafter.

(1) Polymer and Monomer Having Cationic Property

The abovementioned cationic monomer and polymer are not particularly limited, if they are the monomer and polymer having cationic property, and if they are the monomer and the polymer having a group which is ionized to impart cationic group. Further, the cationic monomer and polymer may show the cationic property by a part of a main chain, or may show the cationic property by a side chain substituting group bonded to the main chain.

Further, when the cationic monomer is used, vinyl monomer having a primary amino group, vinyl monomer having a secondary amino group, vinyl monomer having a tertiary amino group, and vinyl monomer having quaternary ammonium group, etc., can be used.

Further, when the cationic polymer is used, the cationic polymer adding the cationic property to synthetic polymer may be used, or the cationic polymer adding the cationic property to natural polymer or microorganism-derived polymer such as cationic cellulose, cationic starch, cationic dextran, cationic guar gum, and cationic chitosan, etc., may be used.

The abovementioned cationic monomer and polymer can be used alone, or may be used in mixture.

(2) Ferrocyanide Compound Metal Salt

The ferrocyanide compound containing at least one kind of the transition metal elements or group 12 elements, for example, includes a substance having a performance of adsorbing or exchanging cesium, such as iron ferrocyanide (Prussian blue), nickel ferrocyanide, copper ferrocyanide, cobalt ferrocyanide, and zinc ferrocyanide, etc. Above all, when treatment is applied to fly ash, nickel ferrocyanide is preferable from a viewpoint of alkalinity of the liquid to be treated becomes high. Inexpensive iron ferrocyanide is also preferable, under a condition in which pH can be adjusted by adding hydrochloric acid into the liquid to be treated.

<3> Radioactive Material Removing Particles

The radioactive material removing particles of the present invention has a structure that at least a part of the surface of the abovementioned magnetic particle is coated with monomer and/or polymer having the cationic property, wherein iron ferrocyanide compound metal salt exists on the surface and/or inside (surface layer portion) of the coating layer.

Amounts of the monomer and/or the polymer having the cationic property, which exists on the surface of the magnetic particle as the coating layer, is 10 mass % or less, preferably 5 mass % or less, and further preferably 2 mass % or less as a pure solid portion included in a treatment liquid used for coating, in terms of the monomer and/or polymer. By setting the solid portion to 10% or less, viscosity can be prevented from being increased, and therefore coating over the magnetic particle is preferably uniform.

The ferrocyanide compound metal salt as a decontamination component that exists on the surface of the radioactive material removing particle, is a compound of ferrocyanide ion and transition metals or group 12 elements, etc. For example, nickelpotassium ferrocyanide, nickel ferrocyanide, iron ferrocyanide (Prussian blue), cobalt ferrocyanide, and zinc ferrocyanide, etc., can be given. Particularly, the ferrocyanide compound metal salt containing nickel in its structure is preferable.

An existence amount of the ferrocyanide compound metal salt can be calculated by quantitatively measuring an amount of the transition metals, etc., of the ferrocyanide compound metal salt (excluding the iron ferrocyanide) by ICP emission spectrometry and fluorescent X-ray analysis, and converting the obtained amount to the existence amount of the ferrocyanide compound metal salt.

More easily, the existence amount of the ferrocyanide compound metal salt can be calculated by a simple comparison between a formation amount of the ferrocyanide compound metal salt calculated from addition amounts of a ferrocyanide material source (aqueous solution of potassium ferrocyanide or sodium ferrocyanide) and a transition metal source, etc., and a weight of initially added magnetic powder.

Preferably, the formation amount of the ferrocyanide compound metal salt in the radioactive material removing particles, is set to not more than 5 times the weight of the magnetic powders, so that the ferrocyanide compound metal salt can be easily separated from the suspended substance when it is magnetically separated. Also, preferably the formation amount of the ferrocyanide compound metal salt is set to at least 0.1 times the weight of the magnetic powder, in consideration of operability and a cost required for decontaminating operation.

<4> Aggregate of Radioactive Material Removing Particles

The aggregate of radioactive material removing particles of the present invention is formed by assembling the abovementioned two or more radioactive material removing particles, and has a structure that pores are opened outward on the surface of the aggregate, and the pores are also opened inside of the aggregate as a gap between radioactive material removing particles. Namely, the aggregate is not formed by having the radioactive material removing particles carried by a carrier, etc., but formed by assembling two or more radioactive material removing particles, namely, the pores so as to open outward and exist in the aggregate.

By having such a sponge-like structure, the liquid to be treated is easily permeated into the aggregate of radioactive material removing particles. Further, by bonding the radioactive material adsorption component to a surface layer of the radioactive material removing particles, a reaction area of the radioactive material adsorption part per one aggregate can be increased. As a result, the radioactive material can be removed in a short time.

In the aggregate of radioactive material removing particles of the present invention, the volume of the pores measured by the mercury press-in method, is 0.5 mL/g or more, preferably 0.6 mL/g or more, further preferably 0.7 mL/g or more, and 5.0 mL/g or less as an upper limit, preferably 4.0 mL/g or less, and further preferably 3.0 mL/or less.

If the volume of the pore is 0.5 mL/or more, the aggregate of radioactive material removing particles has sufficient gaps in its structure, and the liquid to be treated is easily permeated into the aggregate. Further, since the reaction area of the radioactive material adsorption component per one aggregate is large, the radioactive material can be easily removed in a short time.

Meanwhile, if the volume of the pores is 5.0 mL/g or less, a sufficient amount of the radioactive material removing particles exists in its structure, and this is preferable.

The value of the specific surface area of each radioactive material removing particle of the present invention obtained by the BET method, is 1 $m^2/g$ or more, 400 $m^2/g$ or less, preferably 5 $m^2/g$ or more, further preferably 10 $m^2/g$ or more, and 350 $m^2/g$ or less.

If the specific area is 1 $m^2/g$ or more, an area in contact with the treatment liquid can be secured, and a removing efficiency can be secured.

Meanwhile, if the specific surface area is 400 $m^2/g$ or less, the particle size of the radioactive material removing particle is secured, and therefore co-precipitation with an object to be treated does not occur, and this is preferable.

However, the value of the specific surface area obtained by the BET method, is the value measured by the BET method without performing deaeration operation which is usually performed, because there is a risk that the ferrocyanide compound metal salt is thermally decomposed.

Further, when measurement of the cumulative value of the pore volume by the mercury press-in method, is performed to the aggregate of radioactive material removing particles of the present invention, the surface area of each pore can be measured by mercury.

The surface area of the pores by the mercury press-in method shows the surface area of the pores in a range into which the mercury can enter by pressure, thereby making it possible to know a relatively large surface uneven state. Namely, by calculating "pore surface area using the mercury press-in method/specific surface area using the BET method", an existence ratio of relatively large pores in the pores of the whole body of the aggregate, can be known. According to the examination by the inventors of the present invention, it is found that the contaminant can be retrieved in a short time, when the abovementioned existence ratio is 39% or more.

(2) Method of Producing the Aggregate of Radioactive Material Removing Particles Explanation is given for the method of producing the aggregate of radioactive material removing particles according to the present invention, in an order of <1> Source powder containing magnetic particles, <2> Formation of the coating layer over the magnetic particle, <3> Formation of a radioactive material capturing layer on the magnetic particle, <4> Production of the radioactive material contamination agent by forming the radioactive material removing particles into an aggregate.

<1> Source Powder Containing Magnetic Particles

Source powder for producing the radioactive material removing particles of the present invention, is preferably the powder containing metal iron or iron alloy particles (such as cobalt and nickel which are other transition metals for adjusting magnetic properties, and such as silicon and aluminum, etc., for adjusting composition or imparting stability to oxidation). However, the source powder is not particularly limited, if it is the powder having magnetism.

As described above, the average primary particle size of the magnetic particle contained in the source powder, is 10 to 500 nm, preferably 10 to 400 nm, and further preferably 30 to 300 nm. Further, a coercive force of the magnetic particles is 100 to 2000Oe, and preferably about 500 to 2000Oe.

<2> Formation of the Coating Layer Over the Magnetic Particle

The abovementioned source powder is added and stirred in pure water, to thereby obtain source powder slurry. The stirring may be performed so as to disperse the source powder without sedimentation. Aqueous ammonia or sodium hydroxide aqueous solution is added to the obtained source powder slurry so that the source powder slurry is adjusted to alkalinity, to thereby make the surface of a magnetic body have the anionic property.

The abovementioned monomer and/or polymer having the cationic property is added to the source powder slurry which is adjusted to alkalinity, to thereby form the coating layer on the surface of the magnetic particle by the monomer and/or polymer having the cationic property. Stirring in this stage is not necessarily required to be strong stirring, and may be the stirring capable of dispersing the source powder (magnetic particles) without sedimentation. Further, even in a case of a usual stirring, the magnetic particle can be coated by ultrasonication depending on a scale of the treatment.

An addition amount of the monomer and/or the polymer having the cationic property as described above, is 10 mass % or less, preferably 5 mass % or less, and further preferably 2 mass % or less with respect to the weight of the source powder, as a pure solid portion in terms of the monomer and/or polymer. By setting the solid portion to 10% or less, excessively high viscosity is prevented, and a monomer and/or polymer coating layer over the magnetic particle is preferably uniform.

After the coating layer is formed over the surface of the magnetic particle by the monomer and/or the polymer, the monomer and/or the polymer not completely covering the magnetic particle remains in the source powder slurry in some cases. When the monomer and/or the polymer remains in the source powder slurry, the magnetic particle is preferably separated from the remained polymer and/or monomer, by separating the magnetic particles from the source powder slurry after reaction. A separation method includes a magnetic separation, a natural sedimentation, and centrifugal separation, etc. Wherein, the natural sedimentation and the centrifugal separation with no necessity for applying a magnetic field, are suitable because the subsequent steps are not affected thereby. Note that when the amount of the remained monomer and/or polymer is small in the source powder slurry, the separation step can be omitted.

Whether or not the surface of the magnetic particle is coated with the monomer and/or the polymer by the abovementioned series of operation, can be confirmed, by measuring a zeta potential in the magnetic particle, or sampling and drying a part of the magnetic particles, and measuring a content of carbon in the magnetic particle drying body.

<3> Formation of a Radioactive Material Capturing Layer on the Magnetic Particles When the separation step is included, pure water is added to the coating layer-attached magnetic particles of monomer and/or polymer having cationic property on the surface of the magnetic particle, so as to turn into slurry.

The ferrocyanide compound and metal components including at least one kind of the transition metals such as Ni, Fe, Co, Cu, and Zn, and the group 12 elements, are added in this order or in reverse order, to the slurry of the coating layer-attached magnetic particles, to thereby form a decontamination component on the coating layer and/or in the coating layer of the coating layer-attached magnetic particles.

The ferrocyanide compound and the metal compound are preferably in a state of water-soluble substances respectively when being added to the slurry of the coating layer-attached magnetic particles. The magnetic particle is required to be coated efficiently in contact with a produced substance in the adding/coating stage of the ferrocyanide compound and the transition metals or the group 12 elements. Therefore, the coating layer-attached magnetic particles, are dispersed while adding a strong shearing force to the slurry of the coating layer-attached magnetic particles, using a dispersing machine having a strong shearing force.

Regarding the dispersing machine having a strong shearing force, T.K. homomixer (registered trademark) by Primix Corp., and Ultra-Turrax (registered trademark) by IKA Corp., can be given as turbine stator-type mixers, and T.K. Micollider, T.K. homomicline mill (registered trademark), and T.K. highline mill (registered trademark) by Primix Corp., and a static mixer (registered trademark), a high-pressure microreactor (registered trademark), and a high-pressure Homogenizer (registered trademark), etc., by Noritake Co., Ltd., can be given as colloid mills.

Strong/weakness of the shearing force can be evaluated by a blade peripheral velocity of a stirring blade, when a device has the stirring blade. According to the present invention, the "strong shearing force" is exhibited when the blade peripheral velocity is 5.0 (m/s) or more, preferably 7.5 (m/s) or more, and further preferably 10.0 (m/s) or more. If the blade peripheral velocity is 5.0 (m/s) or more, sufficient shearing force can be added to the solution, and the ferrocyanide compound metal salt can be sufficiently adhered to the coating layer. As a result, preferably, a sufficient cesium adsorption amount can be secured in the produced radioactive material removing particles, and therefore a removing performance is secured in removing the contaminant in the liquid to be treated.

Further, by adding a sufficient shearing force, the ferrocyanide compound metal salt can be strongly adhered to the coating layer. If the ferrocyanide compound metal salt is strongly adhered to the coating layer, there is no possibility that the ferrocyanide compound containing radioactive cesium is peeled-off from the surface of the radioactive material removing particles, when stirring operation is performed together with the liquid to be treated, using the produced radioactive material removing particles. Since the ferrocyanide compound metal salt containing radioactive cesium is not peeled-off from the surface of the radioactive material removing particle, preferably the contaminant in the liquid to be treated can be efficiently retrieved by magnetic separation performed later, and a situation that a cyanide compound is remained in the liquid to be treated, can be preferably prevented.

The abovementioned blade peripheral velocity can be calculated by (circle ratio×diameter (m) of turbine blade×the number of rotations of stirring (rotation speed) per 1 second). For example, if the diameter of the turbine blade is 3.0 cm (0.03 m), and the number of rotations of stirring is 8000 rpm, the number of rotations per one second is 133.3 (rps), and the blade peripheral speed is 12.57 (m/s).

Further, in order to obtain a further strong adhesion between the coating layer and the ferrocyanide compound metal salt, the slurry of the magnetic particle and the solution of the ferrocyanide compound and the metal compound may be collided with each other, using a micro mixer or an ultimizer for example. Such an operation is preferable, because separation of the ferrocyanide compound metal salt can be suppressed even if the radioactive material removing particles of the present invention are stored in a slurry state.

<4> Production of the Radioactive Material Decontamination Agent by Forming the Radioactive Material Removing Particles into an Aggregate Water-content is removed from the slurry containing the radioactive material removing particles so that the radioactive material removing particles are formed into an aggregate, to thereby produce the radioactive material decontamination agent.

As a method of removing the water-content from the slurry containing the radioactive material removing particles, the method of forming the aggregate without allowing excessive shrinkage to occur while performing drying operation, is preferably used. Namely, in order to form the pores on the surface of the aggregate so as to be opened outward as the gaps between radioactive material removing particles, a method of speedily removing the water-content from the slurry containing the radioactive material removing particles, is preferably used. The method includes a spray dry method or a freeze dry method, etc., for example. Particularly, when the spray dry method is used, the aggregate of radioactive material removing particles is easily formed into a spherical shape. If the aggregate of radioactive material removing particles is formed into the spherical shape, flowability of the radioactive material decontamination agent is increased, thus preferably improving warkability when performing the decontaminating operation. It is also preferable to form the aggregate of radioactive material removing particles into the spherical shape, from a viewpoint of increasing the reaction area of the aggregate of radioactive material removing particles, and increasing decontamination efficiency.

When the spray-dry method is used as the method of removing the water-content from the slurry containing the radioactive material removing particles, either one of a disc-type spray drier and a nozzle-type spray drier, can be used.

For example, when the nozzle-type spray drier is used, the particle size, the volume of the pores, the value of the specific surface area, and the surface area of each pore, can be adjusted by the pressure of spraying the slurry, the speed of supplying the slurry, the concentration of the solid portion of the slurry, the temperature for drying, and air volume/air speed.

Meanwhile, when the disc-type spray drier is used, the particle size, the volume of the pores, the value of the specific surface area, and the surface area of each pore, can be adjusted by the speed of supplying the slurry, the concentration of the solid portion of the slurry, the temperature for drying, the air volume/air speed, and the rotation speed of the disc, etc.

A heating (inlet) temperature of the spray drier is set to a temperature not allowing the decomposition of the polymer, monomer, and ferrocyanide compound metal salt that exist on the surface of the radioactive material removing particles. Specifically, the heating temperature is set to 300° C. or less, preferably 275° C. or less, and further preferably 250° C. or less.

(3) Method of Removing the Contaminant from the Liquid to be Treated Using the Radioactive Material Decontamination Agent Explanation is given for the method of removing the decontaminant from the liquid to be treated, using the radioactive material decontamination agent of the present invention.

Here, the slurry of incinerated fly ash containing radioactive cesium, is used as the liquid to be treated containing the radioactive material, for describing the method of removing the radioactive cesium as the contaminant.

First, the radioactive cesium is eluted into water by adding the incinerated fly ash containing the radioactive cesium and stirring it into slurry. If the incinerated fly ash is suspended in the water, pH of the liquid is raised in a strong alkaline state (about 12), thereby improving stability of the ferrocyanide compound metal salt contained in the radioactive material decontamination agent. Therefore, pH value of the slurry is preferably adjusted using acid such as hydrochloric acid. The pH value of the slurry is adjusted to 11 or less, preferably 10 or less, and further preferably 9 or less, thereby suppressing an isolation of the cyanide compound from the ferrocyanide compound metal salt. Therefore, the amount of the cyanide compound in the slurry after removing the radioactive cesium, can be suppressed. The time required for stirring the slurry after adding the incinerated fly ash into the water, is set depending on the content of the radioactive cesium, and particularly the content of water-solved radioactive cesium. However, the time for stirring slurry is set to 1 minute or more and preferably 4 hours or more.

The produced radioactive material decontamination agent of the present invention is previously added into the slurry in which the incinerated fly ash is suspended, in the ratio of 10 mass % or less with respect to the weight of the incinerated fly ash, and stirring is continued. The amount of the radioactive material decontamination agent added to the incinerated fly ash may also be 10 mass % or more. However, if 1 mass or more of the radioactive material decontamination agent of the present invention is added, the radioactive cesium in the slurry can be sufficiently retrieved.

The time required for the processing from adding the radioactive material decontamination agent, is varied depending on the volume of the slurry to be treated, but stirring may be performed for 15 minutes or more and preferably 30 minutes or more in a case of the slurry of about 10 L.

Thereafter, magnetic force is added to the slurry after treatment, and the radioactive material decontamination agent with radioactive cesium adsorbed thereon, is adsorbed and selected. The magnetic force generator represented by bar magnet which is always magnetized, or the magnetic force generator represented by electromagnet capable of setting on/off the magnetic force by external setting, for example, superconducting magnet may be used. Further, by using the technique of controlling the generation of magnetism from outside, the radioactive material decontamination agent capturing the radioactive material can be retrieved by remote operation, and this is preferable. The retrieved radioactive material decontamination agent is sealed in a publicly-known vessel having a structure not allowing the radioactive material to be leaked to outside, and safekeeping processing is applied thereto as a high concentrated radioactive material.

The slurry after retrieving the radioactive material decontamination agent, is passed through a filter, etc., and solid/liquid separation is carried out, to thereby retrieve the suspended incinerated fly ash. The solid/liquid separation at this time may be carried out using any one of the publicly-known methods. The separated and retrieved water is circulated and reused as the water-content for dispersing the fly ash again, so that a closed system can be formed for the treatment water. Meanwhile, the incinerated fly ash after cleaning, from which the radioactive cesium is removed, is dumped as industrial waste by a system selected according to a residual amount of radioactivity, after confirmation of this residual amount.

EXAMPLE

The present invention will be specifically described, with reference to examples.

First, explanation is given for evaluation methods in examples of the present invention, and a comparative example, in an order of (1) Particle form, (2) Average particle size and particle size distribution, (3) Specific surface area, (4) Measurement of pore volume, (5) Measurement of true specific gravity, and (6) Method of confirming cesium adsorption ability of the radioactive material decontamination agent.

(1) Particle Form

The form of the aggregate of radioactive material removing particles was confirmed from an image obtained by Field Emission-Scanning Electron Microscope (S-4700 by HITACHI high technologies Corp.) at magnification of 60,000 magnifying powers.

(2) Average Particle Size and Particle Size Distribution

The average particle size and the particle size distribution of the aggregate of radioactive material removing particles, were measured under a condition of a lens diameter: 200 mm, using a laser diffraction type particle size distribution measurement device (HELOS & RODOS-KF by SYMPATEC Corp.).

(3) Specific Surface Area

A value measured by one-point method using 4-Sobe by Yuasa Ionics Co. Ltd., is used for the specific surface area of the aggregate of radioactive material removing particles. However, cyanide compound is adhered to this sample, and there is a possibility that the cyanide compound is decomposed due to the aeration operation by heating, and therefore measurement is performed without performing the aeration operation.

(4) Measurement of the Pores

The pore volume in the aggregate of radioactive material removing particles, was measured using 0.3 to 0.5 g of a sample by the mercury press-in method (AutoPore IV 9500 by Micrometitics Instrument Corporation).

Portions excluding the pores and gap portions were extracted and confirmed, the pores and gap portions showing the space between the aggregates, which show a further remarkable characteristic and which are considered to exist on the surface of the radioactive material removing particles. A calculation method will be described hereafter in an order of <1> A lower limit value of a pore diameter, and <2> An upper limit value of the pore diameter.

<1> A Lower Limit Value of a Pore Diameter

When each pore formed as a gap between the radioactive material removing particles is measured and confirmed by the transmission electron microscope, excluding the pores that exist on the surface layer of the radioactive material removing particle, a lower limit value of the pore diameter is confirmed in a range larger than the diameter of the magnetic particle (indicating a long axis length when the magnetic particle as the source of the radioactive material removing particles has a needle shape, and indicating simply the diameter of the magnetic particle as the source of the radioactive material removing particles hereafter.). However, when data is collected intermittently by the mercury press-in method, a value smaller than the diameter of the magnetic particle which is the source of the radioactive material removing particles, is set as the lower limit value.

For example, the microscope volume is respectively calculated when the data shows the pore diameters of 204 nm, 243 nm, 270 nm, and 315 nm, and when an average diameter of the magnetic particle is 250 nm, which is the source of the radioactive material removing particles, a value in a case of 243 nm, is used as the lower limit value of the pore diameter.

Meanwhile, the mercury press-in method is the method of making mercury enter into the pores, and calculating the pore volume from an amount of the mercury, and the pressure added in the case of the lower limit value of the pore diameter shows a highest pressure value (accordingly, the pore diameter is given as a final cumulative value, meanwhile it is given as the lower limit value.)

<2> An Upper Limit Value of the Pore Diameter

In order to exclude the gap portions that exist between the aggregates of the radioactive material removing particles, the upper limit value of the pore diameter is set in a smaller range than the value of the average particle size ($D_{50}$) of the aggregate of radioactive material removing particles calculated by a laser diffraction type particle size distribution measurement device. However, similarly to the lower limit value, when the data is collected intermittently by the mercury press-in method, the smaller value than the average particle size of the aggregate of radioactive material removing particles, is set as the upper limit value.

For example, the pore volume is respectively calculated when the data shows the pore diameters 6.6 μm, 5.6 μm, 4.5 μm and 3.8 μm, and when $D_{50}$ is 5.3 μm, the value in the case of 4.5 μm is used as the upper limit of the pore diameter. However, for the same reason as the case of the lower limit value, the pressure added in the case of the upper limit value of the pore diameter shows a smallest pressure value (accordingly, the pore diameter is given as an integrated value from this pressure value, meanwhile the pore diameter is given as the upper limit value.)

(5) Measurement of True Specific Gravity

The true specific value of the radioactive cesium decontamination agent was measured based on a definition of "Apparent porosity of refractory bricks, water absorption rate, and a method of measuring specific gravity" described in JIS-R-2205 (1992).

Namely, a test sample was pulverized into a particle size wholly passing through any sieve opening of 300 μm, and thereafter was dried at a constant temperature of 110±5° C. The dried sample was put into a previously weighed pycnometer, with pure water added thereinto, and calmly heated in a warm bath, with pure water pouring up to a marked line, and the whole weights were measured to thereby calculate the true specific gravity from each measurement value by formula (1).

$$\text{True specific gravity} = (P_1 - P)/((P_1 - P) - (P_3 - P_2)) \quad (1)$$

Wherein P=mass of the pycnometer, $P_1$=mass in the case of putting the sample into the pycnometer, $P_2$=mass in the case of putting distilled water into the pycnometer up to the marked line, and $P_3$=mass in the case of putting the sample into the pycnometer and pouring the distilled water up to the marked line.

(6) Method of Confirming Cesium Adsorption Ability of the Radioactive Material Decontamination Agent The cesium adsorption ability of the radioactive material removing agent was confirmed by formula (2) as follows: pH was adjusted to 10.7, and thereafter cesium sulphate was dissolved in the water so as to be about 100 ppm as cesium, and a solution 100 g after dissolving the cesium sulphate was poured into 200 L beaker, and 0.1 g of decontamination powder prepared in the example, etc., was added thereinto, and the solution was stirred under a condition of 250 rpm for 30 minutes at a room temperature, and a residual amount of the cesium in the solution was obtained, the solution from which the decontamination agent was retrieved by magnetic separation from the solution after treatment, and the obtained residual amount of the cesium was analyzed by ICP atomic emission spectroscopy (using High frequency inductive coupling plasma emission analysis device (IRIS/AP)) by Nippon Jarrell-Ash Co., Ltd.

$$\text{Removing rate (\%)} = (\text{concentration before test} - \text{concentration after test})/\text{concentration before test} \times 100 \quad (2)$$

Further, 40 g of radioactive cesium-containing fly ash and 400 mL of water were mixed and stirred for 24 hours, to thereby separate water-soluble cesium from the fly ash. Then, pH was adjusted to 10.7 by hydrochloric acid while suspending the fly ash, and after a radiation dose was measured, the decontamination agent was added thereinto in the ratio of 1/1000 with respect to the weight of the fly ash. Stirring was continued for 30 minutes after adding the decontamination agent so that the radioactive cesium in the liquid was captured by the decontamination agent, and the decontamination agent after treatment was retrieved by neodymium magnet. Subsequently, the radiation dose after decontamination was measured, and thereafter the decontamination ability was calculated by (value of the radiation dose before decontamination−value of the radiation dose after decontamination)/value of the radiation dose before decontamination×100, to thereby calculate decontamination efficiency in a short time. Further, the decontamination efficiency in a long time is also calculated, with a treatment time after adding the decontamination agent set as 24 hours.

Regarding the decontamination ability, radioactivity of the liquid was measured using NaI scintillator (MUCHA by Raytest Corporation), to thereby obtain the radioactivity before decontamination. A specific amount of the decontamination agent was added into the liquid after measurement, and the liquid was stirred for a specific time so that the cesium in the liquid was adsorbed on the decontamination agent, and after the decontamination agent was removed by magnetic separation, the removed amount of the radioactivity was calculated by measuring the radioactivity of the liquid using the NaI scintillator in the same way as before the decontaminating operation.

Distribution coefficient is the ratio of the fly ash before the decontaminating operation with respect to the radioactivity, which is the ratio with respect to the radioactivity of the decontamination agent to which the radioactive cesium is distributed and extracted from the fly ash, when the radioactive cesium contained in the fly ash before the decontaminating operation is distributed and extracted to the decontamination agent from the fly ash by the decontaminating operation. Accordingly, a larger value of the distribution coefficient shows that the radioactivity moves to the decontamination agent. Specifically, the distribution coefficient was calculated by formula (3).

Distribution coefficient (Kd)=[((radioactivity before treatment (Bq/kg)/1000)−(radioactivity after Treatment (Bq/kg)/1000))]/radioactivity after treatment (Bq/kg)×(fly ash addition amount (g)/ weight of the decontamination agent (g))]  (3)

Example 1

540 g of Pure water was poured into the beaker of 1000 mL volume, and 30 g of needle-like iron-cobalt alloy particles having an average long axis length of 235 nm (cobalt/iron=3.0 at %) produced by DOWA Electronics Corporation, was added thereinto, as source powder containing the magnetic particles. Then, a rapidly emulsifying and dispersing machine (TK homomixer MarkII by Primix Corp.) was used, to emulsify and disperse the source powder at 8000 rpm for 30 minutes, to thereby obtain dispersion slurry of the source powder.

2.5 g of aqueous ammonia with a concentration of 21.3% was added into the source powder slurry, to thereby turn pH into basic pH, and thereafter 0.50 g of PDDA (39% of a solid portion of polydimethyldiallylammonium chloride) was added thereinto, so that the magnetic particles are dispersed and emulsified for 30 minutes at 8000 rpm by the abovementioned dispersing machine, to thereby obtain the slurry of the PDDA coating layer-attached magnetic particles.

160 g of aqueous potassium ferricyanide of 0.5 mol/L and 220 g of aqueous nickel sulfate of 0.49 mol/L, were respectively added into the obtained slurry of the coating layer-attached magnetic particles, and emulsification was continued for 30 minutes at 8000 rpm by the abovementioned dispersing machine so that nickel ferrocyanide was adhered to PDDA-attached magnetic powder, to thereby obtain the slurry (about 10% of concentration of the solid portion) containing the radioactive material removing particles.

The obtained slurry containing the radioactive material removing particles, was charged into a static mixer, and was stirred for 5 minutes, to thereby obtain the slurry. The obtained stirred slurry was charged into a micromixer, and processing is performed so that the nickel ferrocyanide on the PDDA coating magnetic powder is sufficiently adhered to PDDA coating layer and/or inside of the surface layer, to thereby obtain the slurry (stirring processing by the static mixer and coating processing for the magnetic particle by the micromixer are collectively described as "MR processing" in some cases in the present invention).

The slurry after MR processing thus obtained was spray-dried (drying condition: inlet temperature: 220° C., spray pressure: 35 mmHg, and slurry supplying speed: 19% (about 200 mL/h)) using a nozzle-type drier (Mini-spray drier B-290 model by Buchi) to thereby obtain the aggregate of radioactive material removing particles and obtain the radioactive material decontamination agent of example 1.

The obtained data is shown in table 1.

Figure 1:
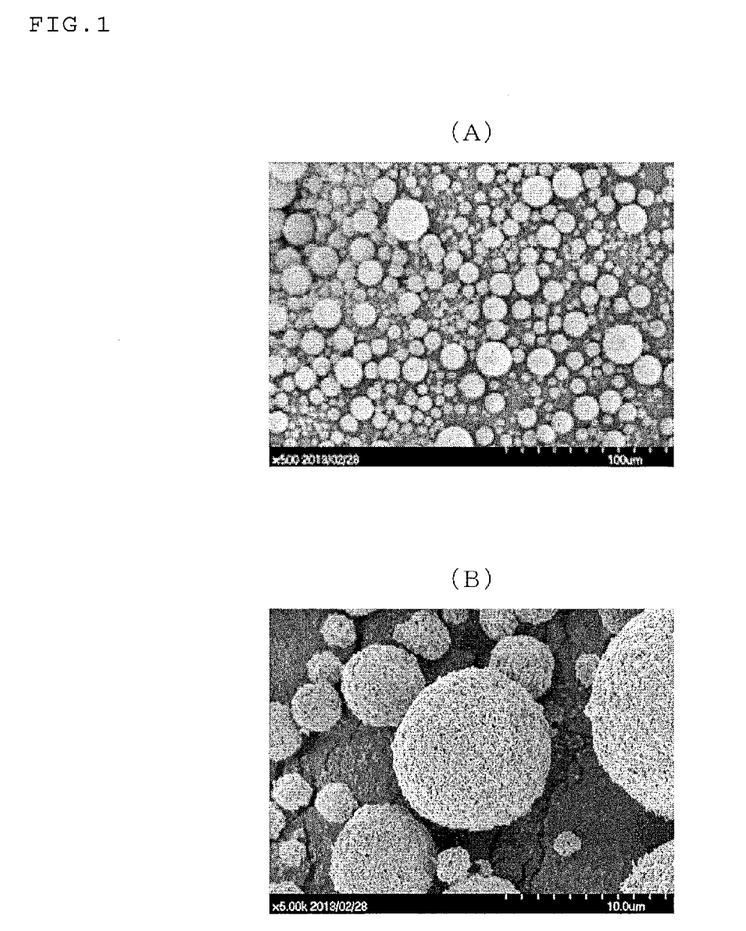
FIG. 1 is an SEM image ((A) is an image of 500 magnifying powers, and (B) is an image of 5000 magnifying powers) of decontamination agent aggregates according to example 1.

The shape of the obtained radioactive material decontamination agent was observed using SEM (Scanning Electron Microscope). The SEM image is shown in FIG. 1 (FIG. 1A is an image of 500 magnifying powers, and FIG. 2B is an image of 5000 magnifying powers). From FIG. 1, it is found that the aggregate of radioactive material removing particles of example 1 has a spherical shape and has an uneven structure on its surface.

Figure 2:
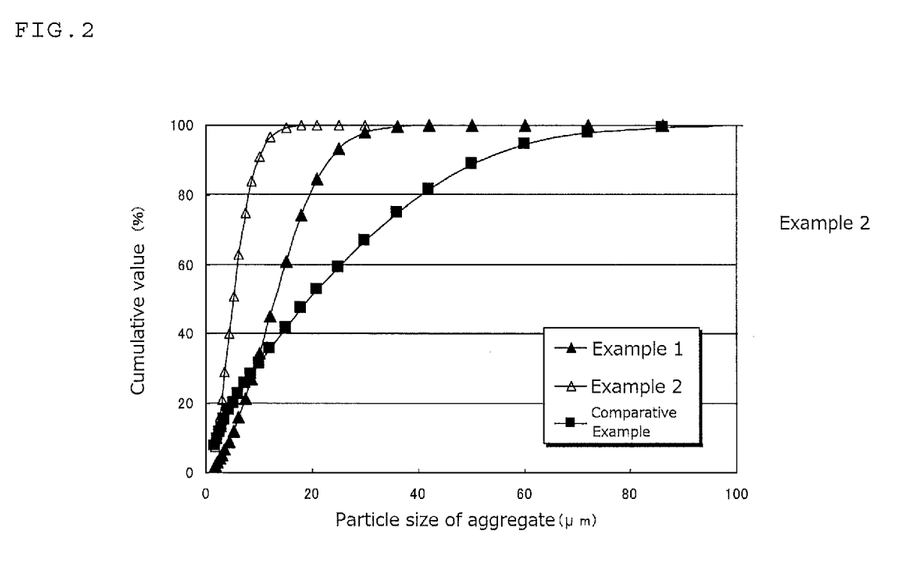
FIG. 2 is a graph showing a particle size distribution of the decontamination agent aggregates according to examples 1, 2, and comparative example.

Next, laser diffraction type particle size distribution measurement was performed to the aggregate of radioactive material removing particles, and a result thereof is plotted by ▲ in FIG. 2. FIG. 2 is a graph in which the diameter of the aggregate is taken on the horizontal axis, and cumulative particle size distribution is taken on the vertical axis. From the particle size distribution of the aggregate of radioactive material removing particles of example 1 shown in FIG. 2, it was so calculated that average aggregate diameter ($D_{50}$ diameter) was 12.9 μm, ($D_{90}$ diameter) was 23.5 μm, and the ratio of the aggregate of 10 μm or less was 34.5%. Further, the value of the specific surface area obtained by the BET method was 63.9 m$^2$/g, and the value of the true specific gravity was 3.55.

Next, the cumulative value of the pore volume of the aggregate was calculated to 0.63 mL/g. Further, the cumulative pore volume was calculated to 0.37 mL/g in a range of not more than the average diameter of the aggregate of radioactive material removing particles of example 1 (the pore diameter was 17.64 μm in this example), and in a range of not less than the average long axis length of the magnetic particles which are the source of the radioactive material removing particles (the pore diameter was 243 nm in this example). Further, the integrated value of the surface area of the pores calculated by the mercury press-in method, was 39.6 m$^2$/g.

Further, a percentage value of the [pore surface area by the mercury press-in method/specific surface area obtained by the BET method] was 62.0%.

The obtained data is shown in table 2.

According to the evaluation for confirming the decontamination ability by the radioactive cesium, the radioactivity was 822.23 Bq/kg before the short decontamination test of 30 minutes, and the radioactivity was 388.09 Bq/kg after the decontamination test, and the decontamination ability was 52.8%.

Further, according to a long evaluation test of 24 hours for confirming the decontamination ability, the radioactivity before the decontamination test was 761.93 Bq/kg, and the radioactivity after the decontamination test was 231.58 Bq/kg, and the decontamination ability was 69.6%. Namely, it is found that the ratio of the absorbing and separating amount in 30 minutes/absorbing and separating amount in 24 hours (removing rate in a short time) reaches 75.9%, and a sufficient decontamination ability is exhibited even in a short time of about 30 minutes. Note that the slurry after decontamination treatment was separated into the incinerated fly ash and elution, to thereby measure the radioactivity of the elution. It is found that the radioactivity of the elution shows a value of not more than a detection limit.

The obtained data is shown in table 3.

Example 2

The radioactive material decontamination agent of example 2 was obtained similarly to example 1, excluding a point that the spray pressure of the nozzle-type spray drying device was set to 50 mmHg.

The obtained data is shown in table 1.

Figure 3:
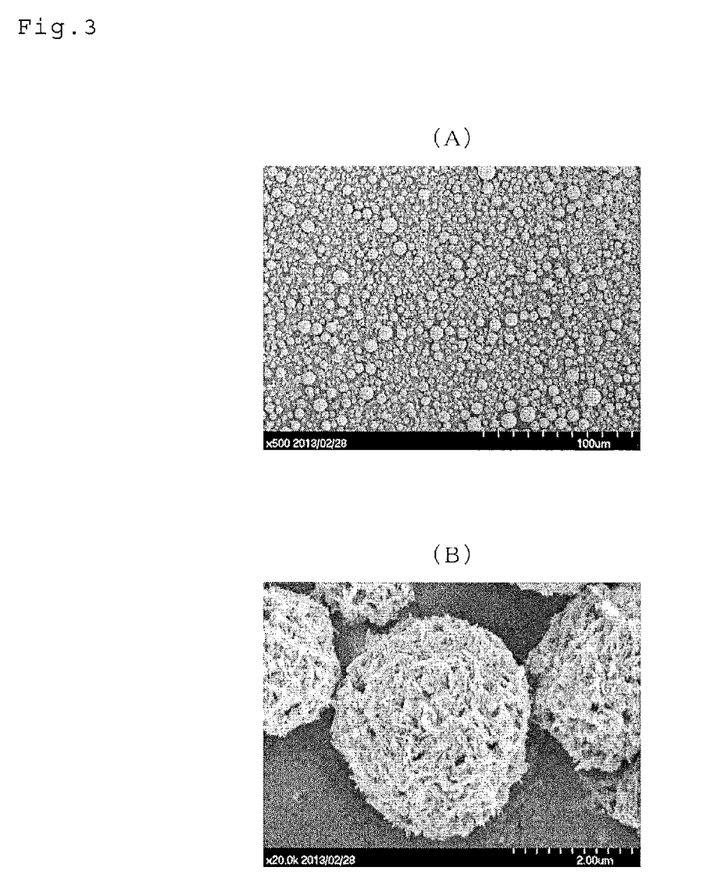
FIG. 3 is an SEM image ((A) is an image of 500 magnifying powers, and (B) is an image of 20000 magnifying powers) of a decontamination agent aggregates according to example 2.

Regarding the obtained radioactive material decontamination agent, the shape of the aggregate of radioactive material removing particles was observed using SEM. The SEM image is shown in FIG. 3 (FIG. 3A is an image of 500 magnifying powers, and FIG. 3B is an image of 20000 magnifying powers.). From FIG. 3, it is found that the aggregate of radioactive material removing particles of example 2 has a spherical shape and has an uneven structure on its surface.

Next, laser diffraction type particle size distribution measurement was performed to the aggregate of radioactive material removing particles, and a result thereof is plotted by Δ in FIG. 2. From the particle size distribution of the aggregate of radioactive material removing particles of example 2 shown in FIG. 2, it was so calculated that average aggregate diameter ($D_{50}$ diameter) was 5.1 μm, ($D_{90}$ diameter) was 9.8 and the ratio of the aggregate of 10 μm or less was 91.1%. Further, the value of the specific surface area obtained by the BET method was 62.5 m²/g, and the value of the true specific gravity was 3.38.

Next, regarding the pore volume, the cumulative value of the pore volume of the aggregate was calculated to 0.92 mL/g.

Further, the cumulative pore volume was calculated to 0.52 mL/g in a range of not more than the average diameter of the aggregate of radioactive material removing particles of example 1 (the pore diameter was 5.53 μm in this example), and in a range of not less than the average long axis length of the magnetic particles which are the source of the radioactive material removing particles (the pore diameter was 243 nm in this example). Further, the integrated value of the surface area of the pores calculated by the mercury press-in method, was 41.3 m²/g.

Further, the percentage value of the [pore surface area by the mercury press-in method/specific surface area by the BET method] was 66.1%.

The obtained data is shown in table 2.

According to the evaluation for confirming the decontamination ability by the radioactive cesium, the radioactivity was 728.7 Bq/kg before the short decontamination test of 30 minutes, and the radioactivity was 285.1 Bq/kg after the decontamination test, and the decontamination ability was 60.9%.

Further, according to a long extraction test of 24 hours, the radioactivity was 761.93 Bq/kg before the decontamination test, and the radioactivity was 245.59 Bq/kg after the decontamination test, and the decontamination ability was 67.8%. Namely, it is found that the ratio of the absorbing and separating amount in 30 minutes/absorbing and separating amount in 24 hours (removing rate in a short time) reaches 89.8%, and similarly to example 1, a sufficient decontamination ability is exhibited even in a short time similarly to example 1. Note that the slurry after decontamination treatment was separated into the incinerated fly ash and elution, to thereby measure the radioactivity of the elution. It is found that the radioactivity of the elution shows not more than a value of detection limit.

The obtained data is shown in table 3.

Example 3

The radioactive material decontamination agent of example 3 was obtained similarly to example 2, excluding a point that the slurry containing the radioactive material removing particles and having 5% concentration of the solid portion, was used, and an undiluted solution supplying speed of the spray drier was set to 17%, and the MR processing was not performed.

The obtained data is shown in table 1.

Figure 4:
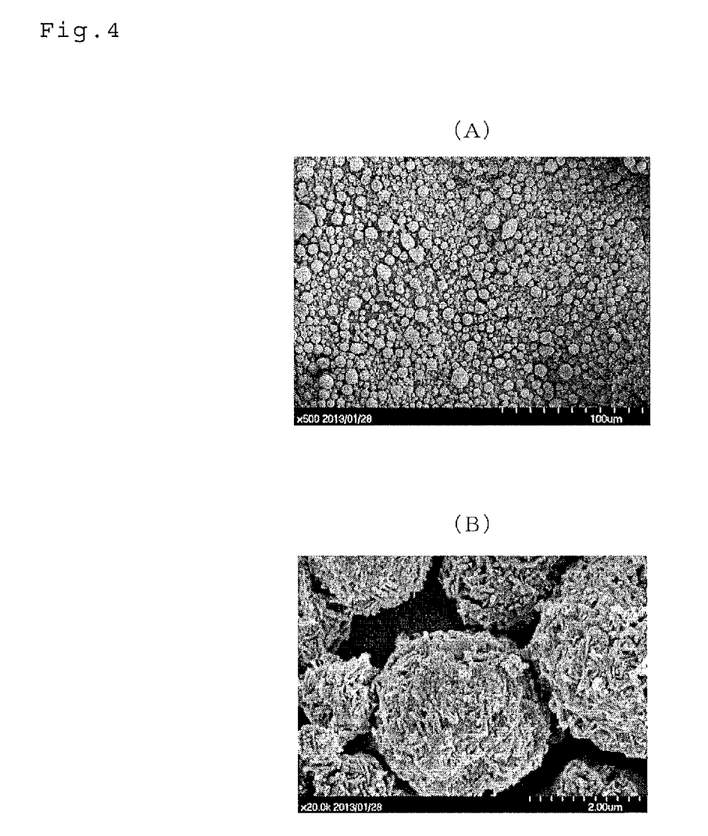
FIG. 4 is an SEM image ((A) is an image of 500 magnifying powers, and (B) is an image of 20000 magnifying powers) of the decontamination agent aggregates according to example 3.
Figure 5:
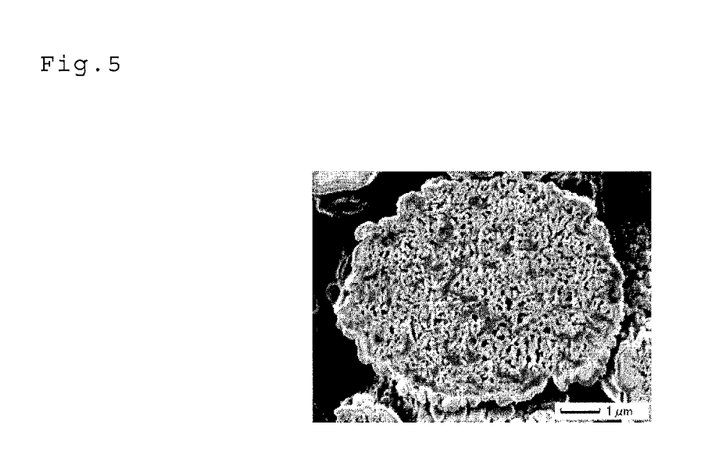
FIG. 5 is an SEM image (an image of 15000 magnifying powers) of a sectional face of a decontamination agent aggregate according to example 3.

Regarding the aggregate of radioactive material removing particles contained in the radioactive material decontamination agent of example 3, the average aggregate diameter ($D_{50}$ diameter) was measured to be 5.4 μm, ($D_{90}$ diameter) was measured to be 10.9 μm, and the ratio of the aggregate of 10 μm or less was measured to be 87.1%. Further, the specific surface area of the aggregate obtained by the BET method was 58.7 m²/g, and the value of the true specific gravity was 3.18. Further, the SEM image of the obtained aggregate is shown in FIG. 4A by magnification of 500 magnifying powers and in FIG. 4B by magnification of 2000 magnifying powers. Further, cross-sectional SEM image of the obtained aggregate (shown by magnification of 15000 magnifying powers) is shown in FIG. 5. As is clarified from these images, the pores exist not only on the surface of the aggregate, but also inside of the aggregate.

Next, the cumulative value of the pore volume of the aggregate was calculated to be 0.84 mL/g. The cumulative pore volume was calculated to 0.48 mL/g in a range of not more than the average diameter of the aggregate of radioactive material removing particles of example 3 (the pore diameter was 5.53 μm in this example), and in a range of not less than the average long axis length of the magnetic particles which are the source of the radioactive material removing particles (the pore diameter was 243 nm in this example). Further, the value of the surface area of the pores calculated by the mercury press-in method was 23.0 m²/g.

Further, the percentage value of the [pore surface area obtained by the mercury press-in method/specific surface area obtained by the BET method] was 39.2%.

The obtained data is shown in table 2.

According to the evaluation for confirming the decontamination ability by the radioactive cesium, the radioactivity was 869.0 Bq/kg before the short decontamination test of 30 minutes, and the radioactivity was 257.3 Bq/kg after the decontamination test, and the decontamination ability was 70.4%.

Further, according to a long extraction test of 24 hours, the radioactivity was 886.6 Bq/kg before the decontamination test, and the radioactivity was 208.4 Bq/kg after the decontamination test, and the decontamination ability was 76.5%. Namely, it is found that the ratio of the absorbing and separating amount in 30 minutes/absorbing and separating amount in 24 hours (removing rate in a short time) reaches 92.0%, and a sufficient decontamination ability is exhibited even in a short time similarly to examples 1 to 2. Note that the slurry after decontamination treatment was separated into the incinerated fly ash and elution, to thereby measure the radioactivity of the elution. It is found that the radioactivity of the elution shows not more than a value of detection limit.

The obtained data is shown in table 3

Comparative Example 1

720 g of pure water was poured into the beaker of 1000 mL, and 30 g of needle-like iron-cobalt alloy particles having an average long axis length of 235 nm (cobalt/iron=3.0 at %) produced by DOWA Electronics Corporation, was added thereinto, as source powder containing the magnetic particles. Then, a rapidly emulsifying and dispersing machine (TK homomixer MarkII by Primix Corp.) was used, to emulsify and disperse the source powder for 30 minutes at 8000 rpm, to thereby obtain source powder slurry.

2.5 g of aqueous ammonia with a concentration of 21.3% was added into the source powder slurry, to thereby turn pH into basic pH, and thereafter 0.25 g of PDDA (39% of a solid portion of polydimethyldiallylammonium chloride) was added thereinto, so that the magnetic particles are dispersed and emulsified at 8000 rpm for 30 minutes by the above-mentioned dispersing machine, to thereby obtain the slurry of the magnetic particles.

82 g of aqueous potassium ferricyanide of 0.5 mol/L and 110 g of aqueous nickel sulfate of 0.49 mol/L, were respectively added into the obtained slurry of the coating layer-attached magnetic particles, and emulsification was continued for 30 minutes at 8000 rpm by the abovementioned dispersing machine so that nickel ferrocyanide was adhered to PDDA-attached magnetic powder, to thereby obtain the slurry (about 5% concentration of the solid portion) containing the radioactive material removing particles.

The obtained slurry containing the radioactive material removing particles was filtered by a hardened filter paper of No. 5C without spraying and drying process, and thereafter was dried under a nitrogen atmosphere for 24 hours at a room temperature, to thereby obtain the aggregate of radioactive material removing particles of comparative example 1.

The obtained data is shown in table 1.

Disintegrating processing was applied to the obtained aggregate of radioactive material removing particles using an agate mortar under nitrogen atmosphere, to thereby obtain the radioactive material decontamination agent of comparative example 1. The obtained radioactive material decontamination agent was sieved under the nitrogen atmosphere, to thereby distribute the particle size of the aggregates into diameters of 40 to 63 μm respectively.

Figure 6:
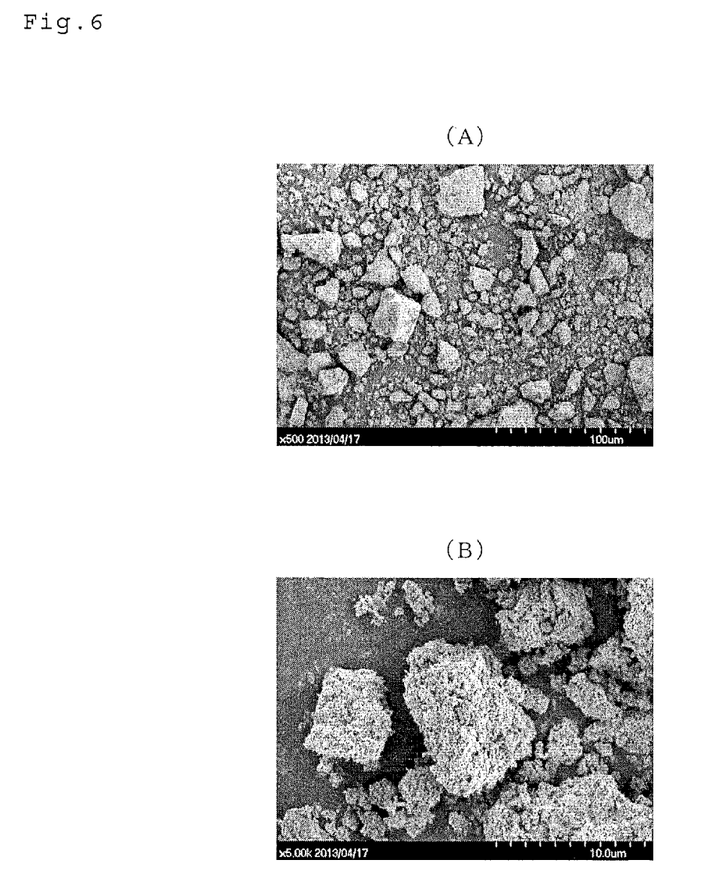
FIG. 6 is an SEM image ((A) is an image of 500 magnifying powers, and (B) is an image of 50000 magnifying powers) of decontamination agent aggregates according to comparative example 1.

The shape of the obtained radioactive material decontamination agent was observed using the Scanning Electron Microscope. The observation is shown in FIG. 6 (FIG. 6A is an image of 500 magnifying powers, and FIG. 6B is an image of 5000 magnifying powers). From FIG. 4, it is found that the aggregate of radioactive material removing particles of comparative example 1 has an indeterminate form and has an uneven structure on its surface.

Next, laser diffraction type particle size distribution measurement was performed to the aggregate of radioactive material removing particles, and a result thereof was plotted by ■ in FIG. 2. From the particle size distribution of the aggregate of radioactive material removing particles of comparative example 1 shown in FIG. 2, it is found that average aggregate diameter ($D_{50}$ diameter) was 19.4 μm, ($D_{90}$ diameter) was 52.0 μm, and the ratio of the aggregate of 10 μm or less was 31.6%. Further, the value of the specific surface area obtained by nitrogen adsorption method was 67.5 m$^2$/g, and the value of the true specific gravity was 3.59.

Next, regarding the pore volume, the cumulative value of the pore volume of the aggregate was calculated to be 0.46 mL/g.

The cumulative value of the pore volume in a range of not more than the average diameter of the aggregate of radioactive material removing particles of comparative example 1 (the pore diameter was 17.6 μm in this comparative example 1), was calculated to be 0.29 mL/g.

Further, the cumulative value of the pore volume was 0.28 mL/g in a range of not more than the average diameter of the aggregate of radioactive material removing particles of comparative example 1, and in a rage of not less than the average long axis length of the magnetic particles which are the source of the radioactive material removing particles (the pore diameter was 243 nm in this comparative example).

Further, the value of the surface area of the pores calculated by the mercury press-in method was 25.3 m$^2$/g.

Further, the percentage value of [pore surface area obtained by the mercury press-in method/specific surface area obtained by the BET method] was 37.5%.

The obtained data is shown in table 2.

Further, the radioactivity was 795.4 Bq/kg before the short decontamination test of 30 minutes, and the radioactivity was 565.1 Bq/kg after the decontamination test, and the decontamination ability was 29.0%. According to a long evaluation test of 24, the radioactivity before the decontamination test was 761.93 Bq/kg, and the radioactivity after the decontamination test was 269.15 Bq/kg, and the decontamination ability was 64.7%. Namely, it is found that the ratio of the absorbing and separating amount in 30 minutes/absorbing and separating amount in 24 hours (removing rate in a short time) stays at 44.8%. Namely, it is found that a sufficient decontamination ability is exhibited if a long time treatment can be applied to the liquid, but the decontamination ability is insufficient in a case of a short time decontaminating operation. Note that the slurry after decontamination treatment was separated into the incinerated fly ash and the elution, and the radioactivity of the elution was measured. Then, the reactivity of the elution shows the value of not more than the detection limit.

The obtained data is shown in table 3.

TABLE 1

|  | Slurry | | | Condition of spray drying operation | | |
|---|---|---|---|---|---|---|
|  | Concentration of solid portion | MR Processing | Filtering | Inlet temperature (° C.) | Spray pressure (mmHg) | Supplying speed (%) |
| Example 1 | 10% | Yes | No | 220 | 35 | 19 |
| Example 2 | 10% | Yes | No | 220 | 50 | 19 |
| Example 3 | 5% | No | No | 220 | 50 | 17 |
| Comparative example 1 | 5% | No | Filtering | — | — | — |

TABLE 2

|  | Particle size distribution | | | Cumulative pore volume | | Specific surface area | | Mercury method/ |
|---|---|---|---|---|---|---|---|---|
|  | $D_{50}$ (μm) | $D_{90}$ (μm) | 10μ or less (%) | Whole range (mL/g) | Specific range (mL/g) | Mercury method (m$^2$/g) | BET method (m$^2$/g) | BET method (%) |
| Example 1 | 12.9 | 23.5 | 34.5 | 0.63 | 0.37 | 39.6 | 63.9 | 62.0 |
| Example 2 | 5.1 | 9.8 | 91.1 | 0.92 | 0.52 | 41.3 | 62.5 | 66.1 |
| Example 3 | 5.4 | 10.9 | 87.1 | 0.84 | 0.48 | 23.0 | 58.7 | 39.2 |

TABLE 2-continued

| | Particle size distribution | | | Cumulative pore volume | | Specific surface area | | Mercury method/ |
|---|---|---|---|---|---|---|---|---|
| | $D_{50}$ (μm) | $D_{90}$ (μm) | 10μ or less (%) | Whole range (mL/g) | Specific range (mL/g) | Mercury method ($m^2/g$) | BET method ($m^2/g$) | BET method (%) |
| Comparative example 1 | 19.4 | 52.0 | 31.6 | 0.46 | 0.29 | 25.3 | 67.5 | 37.5 |

TABLE 3

| | Removing rate (30 minutes) | | Removing rate (24 hors) | | Removing rate in short time (%) |
|---|---|---|---|---|---|
| | (%) | Distribution coefficient | (%) | Distribution coefficient | |
| Example 1 | 52.8 | 1118.7 | 69.6 | 2290.1 | 75.9 |
| Example 2 | 60.9 | 1555.7 | 67.8 | 2102.4 | 89.8 |
| Example 3 | 70.4 | 2377.9 | 76.5 | 3254.2 | 92.0 |
| Comparative example 1 | 29.0 | 407.5 | 64.7 | 1830.9 | 44.8 |

What is claimed is:

1. An aggregate of radioactive material removing particles in which two or more radioactive material removing particles having magnetic particles and a radioactive material adsorption component are assembled, wherein a pore volume in the aggregate is 0.5 mL/g or more and 5.0 mL/g or less, and
the pore volume means a cumulative value obtained by a mercury press-in method.

2. An aggregate of radioactive material removing particles in which two or more radioactive material removing particles having magnetic particles and a radioactive material adsorption component are assembled,
wherein a cumulative value of a pore volume in the aggregate is 0.3 mL/g or more and 3.0 mL/g or less in a range in which pore volume diameter in the aggregate is larger than an average particle size of each magnetic particle which is a source of the radioactive material removing particles, and smaller than an average particle size of the aggregate,
wherein the pore volume means a cumulative value obtained by a mercury press-in method.

3. The aggregate of radioactive material removing particles according to claim 1, wherein a specific surface area of the aggregate obtained by BET method is 1 $m^2/g$ or more and 400 $m^2/g$ or less, wherein the BET method is the method of not performing deaeration operation.

4. The aggregate of radioactive material removing particles according to claim 1, wherein the average particle size ($D_{50}$ diameter) is 0.1 μm or more and 100 μm or less.

5. The aggregate of radioactive material removing particles according to claim 1, wherein the radioactive material adsorption component is a ferrocyanide compound including at least one kind of transitional metal elements or group 12 elements.

6. A method of producing an aggregate of radioactive material removing particles, comprising the step of drying a slurry of a decontamination agent by spray drying, wherein ferrocyanide compound metal salt is formed as a radioactive material removing substance on a surface of a magnetic particle with polymer or monomer layer formed on its surface by wet process.

7. The method of producing an aggregate of radioactive material removing particles according to the claim 6, comprising the steps of:
forming the polymer or monomer layer on the magnetic particle by adding polymer or monomer having cationic property, to the slurry in which the magnetic particles are dispersed; and
forming a decontamination component on a coating layer and/or in the coating layer of the coating layer-attached magnetic particles by adding the ferrocyanide compound including at least one kind of the transition metal elements or
the group 12 elements, to the slurry of the coating layer-attached magnetic particles.

8. The method of producing an aggregate of radioactive material removing particles according to claim 6, wherein the spray drying is performed by a spray dryer.

9. A method of removing a contaminant, wherein the aggregate of radioactive material removing particles according to claim 1, is dispersed in a liquid to be treated containing a contaminant, so that the contaminant is moved to the aggregate of radioactive material removing particles.

10. The method of removing a contaminant according to claim 9, wherein the decontamination material is radioactive cesium and/or radioactive thallium.

11. The aggregate of radioactive material removing particles according to claim 2, wherein the average particle size ($D_{50}$ diameter) is 0.1 μm or more and 100 μm or less.

12. The aggregate of radioactive material removing particles according to claim 3, wherein the average particle size ($D_{50}$ diameter) is 0.1 μm or more and 100 μm or less.

13. The aggregate of radioactive material removing particles according to claim 2, wherein the radioactive material adsorption component is a ferrocyanide compound including at least one kind of transitional metal elements or group 12 elements.

14. The aggregate of radioactive material removing particles according to claim 3, wherein the radioactive material adsorption component is a ferrocyanide compound including at least one kind of transitional metal elements or group 12 elements.

15. The aggregate of radioactive material removing particles according to claim 4, wherein the radioactive material adsorption component is a ferrocyanide compound including at least one kind of transitional metal elements or group 12 elements.

16. The method of producing an aggregate of radioactive material removing particles according to the claim 7, wherein the spray drying is performed by a spray dryer.

17. A method of removing a contaminant, wherein the aggregate of radioactive material removing particles according to claim 2, is dispersed in a liquid to be treated containing a contaminant, so that the contaminant is moved to the aggregate of radioactive material removing particles.

18. A method of removing a contaminant, wherein the aggregate of radioactive material removing particles according to claim 3, is dispersed in a liquid to be treated containing a contaminant, so that the contaminant is moved to the aggregate of radioactive material removing particles.

19. A method of removing a contaminant, wherein the aggregate of radioactive material removing particles according to claim 4, is dispersed in a liquid to be treated containing a contaminant, so that the contaminant is moved to the aggregate of radioactive material removing particles.

20. A method of removing a contaminant, wherein the aggregate of radioactive material removing particles according to claim 5, is dispersed in a liquid to be treated containing a contaminant, so that the contaminant is moved to the aggregate of radioactive material removing particles.

* * * * *